July 26, 1966 R. PECK 3,262,197
SPATTER PROOF WELDING CLAMP AND WELDING METHOD
Filed July 16, 1963
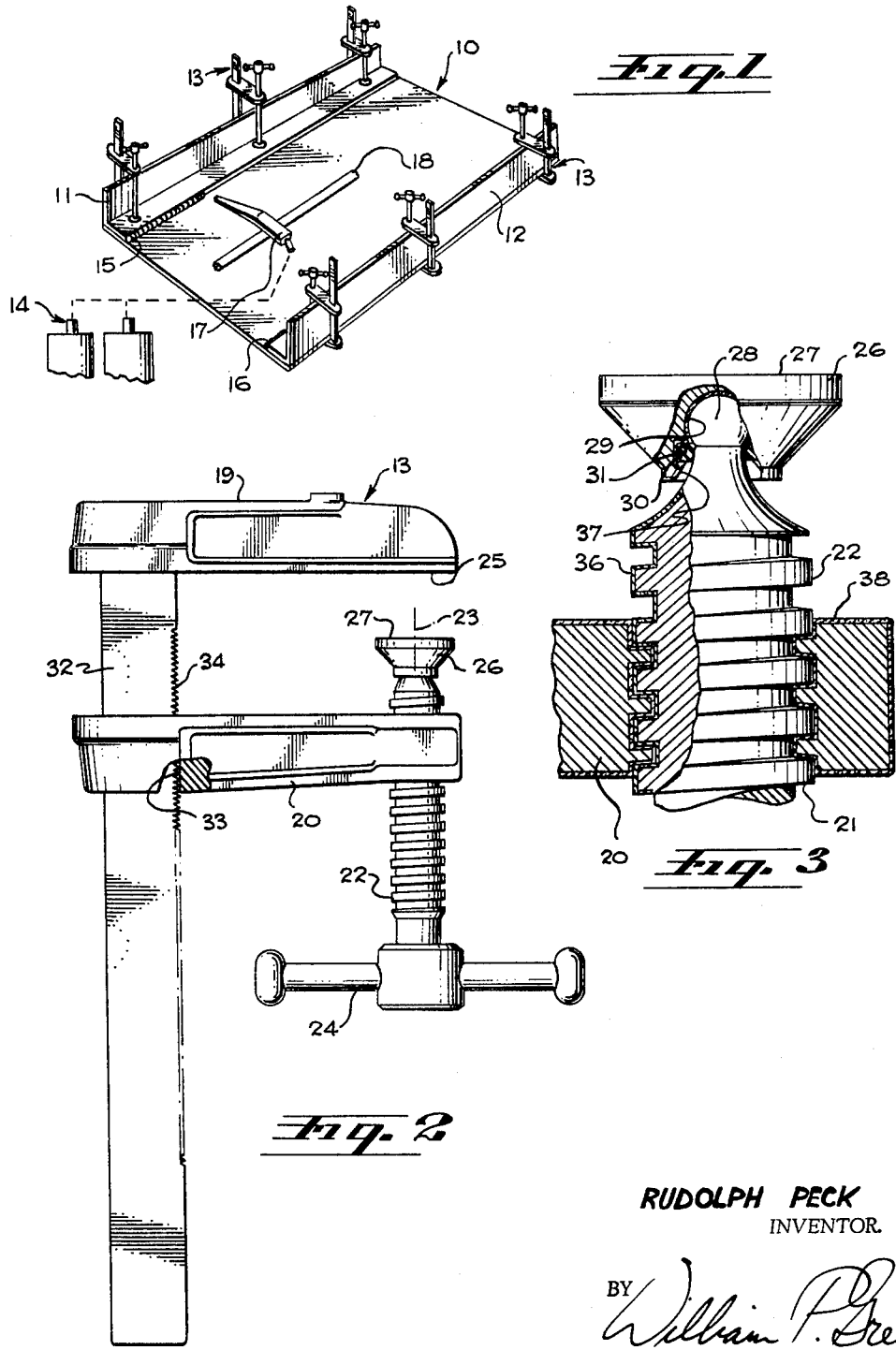
RUDOLPH PECK
INVENTOR.
BY William P. Green
ATTORNEY United States Patent Office 3,262,197
Patented July 26, 1966

3,262,197
SPATTER PROOF WELDING CLAMP AND
WELDING METHOD
Rudolph Peck, 999 S. San Rafael, Pasadena, Calif.
Filed July 16, 1963, Ser. No. 295,350
6 Claims. (Cl. 29—493)

This application is a continuation-in-part of copending application S.N. 23,078 filed April 18, 1960 by Rudolph Peck on "Spatter Proof Welding Clamp" and now abandoned.

This invention relates to improved welding apparatus and methods, and in certain respects is particularly concerned with the structure of a unique type of welding clamp.

In many types of welding operations, it is desirable or necessary to clamp two or more work pieces together temporarily by means of screw type clamps, while the work pieces are being welded to secure them together permanently. To maximize the effectiveness and reliability of the weld, it is normally desired that the clamps hold the work piece very close to the actual welding location. The two gripping jaws or elements of the clamp engage the work at opposite sides near this welding location, and are tightenable against the work, to attain an effective holding condition, by tightening a threaded adjusting screw.

One difficulty which is frequently encountered in using welding clamps of this type results from the fact that a welding torch or head tends to produce a substantial amount of "spatter" of the high temperature welding material, and that spattered material very frequently impinges against or falls on the adjusting screw of the clamp. The high temperature of the spattered material causes it to weld tightly to the screw threads, and form projections or irregularities on the threads which prevent or limit subsequent adjustment of the screw relative to the rest of the clamp. When this happens, the clamp becomes completely useless, since without a capacity for adjustment to tighten the clamp against the work structure, no clamping action can be attained.

A major object of the present invention is to provide welding apparatus including screw threaded clamps of the above discussed type, but in which the clamps are especially designed to very effectively prevent the adherence of any spattered welding material to the threads of the adjusting screws. The screws may then be positioned in very close proximity to the welding operation, at locations such that the welding equipment may spatter freely onto the threads, but without any danger whatever of permanent adherence of the spattered welding material to the threads. Also, the treatment which is given to the threads, in addition to rendering them spatterproof, acts to improve the threads in certain other respects, so that the overall effectiveness of the threaded connection is far superior to that of conventional clamps. In addition, it is found desirable in many instances to also treat and render spatter-proof certain other portions of the clamps, including specifically the usual elongated connector bar by which the two jaws of the clamp may be connected together, and along which one of the jaws may be slidably adjustable.

To attain the above results, I coat the threads of the adjusting screw with a coating consisting essentially of a tin-metal-phosphate complex, in which the metal is the metal from which the screw is formed. This coating is bonded continuously and very tightly to the screw threads, and is of such a character that spattered welding material will not adhere to the coating. The coating is of the type disclosed and claimed in U.S. Patents Nos. 2,478,954, dated August 16, 1949, and 2,854,367, dated September 30, 1958. This coating is formed by first forming a conventional phosphate coating on the threads, and then treating that phosphate coating with an aqueous solution of a stannous salt, to produce the ultimate tin-metal-phosphate complex. The resultant coating is considerably smoother and harder than a conventional phosphate coating, and as a result decreases wear of the thread surfaces in addition to rendering them spatter-proof. Further, the coating is corrosion resistant, is capable of being permanently dyed to virtually any color which may be desired (by incorporating a dye in the tin-metal-phosphate complex), and thus in several ways renders the overall clamp structure far superior to a conventional clamp arrangement.

The presence of the tin in the tin-metal-phosphate complex is of great importance to the attainment of the desired spatter-proofing result and other advantages of the invention. In the absence of such a tin component, a conventional phosphate coating is completely unable to attain the desired result of preventing adherence of weld spatter to a clamp or other welding device. Of all of the various types of phosphate coatings, the only type with which I am familiar which has proven successful for preventing adherence of weld spatter is the particular type discussed herein and consisting of a tin-metal-phosphate complex.

The above and other features and objects of the present invention will be better understood from the following detailed description of the typical embodiment illustrated in the accompanying drawing in which:

FIG. 1 is a perspective view showing a welding installation embodying the invention;

FIG. 2 is an enlarged side view of one of the clamps of FIG. 1; and

FIG. 3 is a further enlarged partly sectional view of a portion of the FIG. 2 clamp.

In FIG. 1, there is represented at 10 a work piece typically taking the form of a sheet of metal, to which there are to be welded two additional work elements typically illustrated as angle irons 11 and 12. The angle irons are clamped to sheet 10 along its opposite edges by means of a series of screw type clamps 13. The angle irons are to be welded in place on sheet 10 by means of any conventional welding equipment, typically represented at 14, adapted to form a pair of elongated welds 15 and 16 between sheet 10 and the edges of the two angle irons 11 and 12. If desired, the welding head 17 may be mechanically mounted in a proper location relative to the work structure to perform the desired welding operation. For example, where elongated welds of the illustrated type are to be formed, the welding head 17 may be mounted by a suitable guide structure represented at 18 for bodily movement along a proper path for forming one or both of the welds.

FIGS. 2 and 3 show the structure of the individual clamps 13 of the FIG. 1 welding apparatus. Each of these clamps typically has a first rigid metal jaw 19 adapted to engage one side of the work structure, and a second rigid metal jaw 20 extending parallel to jaw 19 and adapted to be received at the second side of the work. Jaw 20 contains at its free end an internally threaded bore 21, within which there is received an externally threaded adjusting or tightening screw 22. The threads of elements 20 and 22 may both be of square cross-section, as shown, and are centered about an axis 23 extending perpendicular to the two jaws 19 and 20. At one of its ends, screw 22 rigidly carries a transverse handle 24 by which the screw is turned manually. At its opposite end, directly opposite the end portion of transverse gripping face 25 of jaw 19, screw 22 rotatably carries a gripping element 26.

The element 26 may have a planar gripping face 27 extending transversely of axis 23, and parallel to the planar gripping face 25 of jaw 19. Element 26 is free for rotary movement relative to screw 22 about axis 23, so that element 26 need not turn with the screw upon tightening of the screw to grip a work piece. To form this rotary connection between parts 22 and 26, the upper end of screw 22 (as viewed in FIGS. 2 and 3) may form a ball or sphere 28, which is received and movably confined within a socket 29 formed in part 26. The ball 28 may be retained within the socket by means of a resilient snap ring 30, received within a locking groove 31 formed in the inner wall of part 26.

In the illustrated device, the two jaws 19 and 20 are connected together by means of a connector bar 32, which is rigidly attached to jaw 19, and which extends slidably through a passage 33 formed in jaw 20. As is conventional, the fit of bar 32 in passage 33 is just loose enough to cause the bar to frictionally bind in passage 33 when screw 22 is tightened, to thereby releasably lock jaw 20 in any desired set position relative to bar 32. Also, the edge of the bar 32 which faces toward screw 22 may if desired have a series of small irregularities or teeth 34, to assist in retaining the jaw 20 in a set position.

In FIG. 3, the coating for rendering screw 22 spatter-proof is illustrated at 36. This coating preferably covers the entire surface area of all of the threads of screw 22. In the preferred form of the invention, the coating 36 is not limited to merely the screw 22, but may be provided on all surfaces of all of the various parts 19, 20, 22, 24, 26 and 32 of the clamp. In this way, all of the various parts are rendered completely spatter-proof. FIG. 3 shows coatings of this type at 37 and 38 on parts 26 and 20 respectively. The coating 37 on part 26 is represented as extending about the entire outer surface of that part, and also along the entire inner wall of the recess into which screw 22 projects. The projecting portion of the screw is of course also coated, as may be the ring 30, to positively prevent the adherence of any spattered welding material to parts 22, 26 or 30 in a manner interfering with the free movability of these parts. Further, the coating 38 of jaw 20 may coat the surfaces of all of the internal threads 21 in jaw 20. The coating of connector bar 32 is also of considerable importance, since it prevents interference by any adhered welding material with the free movability of jaw 20 along bar 32.

As has been mentioned previously, the coating on screw 22, and the coatings on the other parts where employed, take the form of a tin-metal-phosphate coating (which may have a dye incorporated therein to form more specifically a tin-metal-dye-phosphate complex), and in which the metal of the complex is the metal employed in forming the screw or other coated part. This metal is normally steel, iron, or a ferrous alloy. The coatings are formed in accordance with the teachings and examples of Patent No. 2,478,954, preferably incorporating the improvement taught by the specification and examples of Patent No. 2,854,367. More specifically, the parts are first phosphate coated in conventional manner, employing any of the known phosphate treatments such as those known commercially as Parkerizing, Bonderizing, Granodizing, etc. After such phosphate coating, the parts are then dipped in a solution of a suitable stannous salt of the character defined in the above patents, while the solution is at boiling temperature, after which the pieces are removed, rinsed and dried. The result is a tin-metal-phosphate complex formed as a coating on the part and having the desired spatter-proof characteristic. In most instances, it is found desirable to incorporate in the stannous salt solution a dye acting to give to the coating a distinctive and pleasing external appearance. The stannous salt which is utilized in most instances is stannous chloride.

Without discussing the treating process in greater detail herein, it may be stated merely that a preferred process is that outlined by Example 1 of Patent No. 2,478,954, which may be improved by the feature incorporated in Example 1 of Patent No. 2,854,367. Also, these examples may be further altered by the addition of a dye, either in the stannous chloride bath, or in a subsequent treating bath. If preferred, the processes of any of the other examples of the mentioned patents may be employed, instead of the specified first examples.

In using the clamps, the work parts are positioned between gripping element 26 and jaw 19, as seen in FIG. 1, jaw 20 is moved as close to jaw 19 as practical, and handle 24 is then turned to tighten the screw and gripping element 26 against the work. This tightly grips the work within the clamp, following which the welding apparatus is utilized to produce the desired welds. As welding material spatters onto screw 22 or any other portion of a clamp, the surface coating 36, 37, 38, etc. positively prevents adherence of the welding material to the metal of the clamp, so that there is no danger of permanently damaging the clamp regardless of how close the welding head may be thereto. As will be apparent, this affords a very decided advantage over a conventional clamp in which spattered welding material adheres readily and very tightly to the metal of the clamp, and may completely destroy the usefulness of the clamp after a very short welding period. The coating also causes the various threads and other parts to present a much smoother surface at all points, since the coating is of a character smoothing over any irregularities. As a result, the operation of the threaded connection is much smoother and more reliable. Also, the coating is harder than an uncoated ferrous metal, and therefore decreases the tendency of the threads and other parts for wear from extended use. Besides these numerous advantages, the appearance of the clamp is considerably improved, particularly where a dye is incorporated in the coating to form a tin-metal-dye phosphate complex coating.

What is claimed as new is:

1. A spatter proof welding clamp for holding a work structure during a welding operation and comprising a jaw for engaging and bearing against a first side of said work structure, a gripping element opposite said jaw and relatively movable toward and away from the jaw to engage and bear against the opposite side of the work structure, a tightening screw operable when rotated to tighten said gripping element toward the jaw and against the work structure to tightly clamp the latter between the jaw and gripping element, said screw having threads positioned in proximity to the gripping element and exposed to spatter of molten welding material onto the threads during performance of a welding operation on the gripped work structure, said threads being formed of metal and having a coating thereon consisting essentially of a tin-metal-phosphate complex in which the metal is that from which the threads are formed and to which coating molten spattered welding material will not effectively adhere.

2. A spatter proof welding clamp for holding a work structure during a welding operation and comprising a first jaw for engaging and bearing against a first side of said work structure, a gripping element opposite said first jaw and relatively movable toward and away from the jaw to engage and bear against the opposite side of the work structure, a tightening screw operable when rotated to tighten said gripping element toward the first jaw and against the work structure to tightly clamp the latter between the first jaw and gripping element, a second jaw to be received in spaced relation to the first and having internal threads within which said screw is threadedly received, said screw having threads positioned in proximity to the gripping element and exposed to spatter of molten welding material onto said threads of the screw during performance of a welding operation on the gripped work structure, said threads of the screw and second jaw being formed of metal and having a coating thereon consisting essentially of a tin-metal-phosphate complex in which the metal is that from which the threads are formed and to which coating molten spattered welding material will not effectively adhere.

3. A spatter proof welding clamp for holding a work structure during a welding operation and comprising a first jaw for engaging and bearing against a first side of said work structure, a gripping element opposite said first jaw and relatively movable toward and away from the jaw to engage and bear against the opposite side of the work structure, a tightening screw operable when rotated to tighten said gripping element toward the first jaw and against the work structure to tightly clamp the latter between the first jaw and gripping element, a second jaw to be received in spaced relation to the first and having internal threads within which said screw is threadedly received, said screw having threads positioned in proximity to the gripping element and exposed to spatter of molten welding material onto said threads of the screw during performance of a welding operation on the gripped work structure, a mounting bar attached to said first jaw and extending through said second jaw in a relation mounting the latter for adjusting movement relative to and along the bar and toward and away from the first jaw, said threads of the screw and said mounting bar both being formed of metal and having a coating thereon consisting essentially of a tin-metal-phosphate complex, in which the metal is that from which the threads or bar are formed, to which complex molten spattered welding material will not effectively adhere.

4. A spatter proof welding clamp for holding a work structure during a welding operation and comprising a jaw for engaging and bearing against a first side of said work structure, a gripping element opposite said jaw and relatively movable toward and away from the jaw to engage and bear against the opposite side of the work structure, a tightening screw operable when rotated to tighten said gripping element toward the jaw and against the work structure to tightly clamp the latter between the jaw and gripping element, said screw having threads positioned in proximity to the gripping element and exposed to spatter of molten welding material onto said threads during performance of a welding operation on the gripped work structure, said threads being formed of metal and having a coating thereon consisting essentially of a tin-metal-phosphate complex in which the metal is that from which the threads are formed and to which coating molten spattered welding material will not effectively adhere, said screw and said gripping element having interfitting metal connector portions forming a connection pivotally attaching the gripping element to the screw for actuation thereby, and there being a coating on said interfitting connected portions of the gripping element and screw consisting essentially of a tin-metal-phosphate complex, in which the metal is that from which the connector portions are formed, to which complex molten spattered welding material will not effectively adhere.

5. A spatter proof welding clamp for holding a work structure during a welding operation and comprising a first jaw for engaging and bearing against a first side of said work structure, a gripping element opposite said first jaw and relatively movable toward and away from the jaw to engage and bear against the opposite side of the work structure, a tightening screw operable when rotated to tighten said gripping element toward the first jaw and against the work structure to tightly clamp the latter between the first jaw and gripping element, a second jaw to be received in spaced relation to the first and having internal threads within which said screw is threadedly received, said screw having threads positioned in proximity to the gripping element and exposed to spatter of molten welding material onto said threads of the screw during performance of a welding operation on the gripped work structure, a metal mounting bar attached to said first jaw and extending through said second jaw in a relation mounting the latter for adjusting movement relative to and along the bar and toward and away from the first jaw, said screw and said gripping element having metal connector portions interfitting in a pin and socket connection pivotally attaching the gripping element to the screw for actuation thereby, and there being a coating on said threads of the screw and said second jaw and on said mounting bar and said connector portions consisting essentially of a tin-metal-phosphate complex, in which the metal is that from which the threads, bar and connector portions respectively are formed, to which complex molten spattered welding material will not effectively adhere.

6. The welding method that comprises clamping a work structure in a predetermined condition for welding by means of a clamp having an adjusting screw with threads exposed to spatter of welding material thereonto, turning said screw to tighten the clamp on the work structure, welding the work structure in close proximity to the screw with the result that molten welding material may spatter on said threads of the screw, and precoating said threads of said screw with a coating consisting essentially of a tin-metal-phosphate complex, in which the metal is that from which the threads are formed, to prevent adherence of the molten spattered welding material to the threads.

References Cited by the Examiner
UNITED STATES PATENTS

| | | | |
|---|---|---|---|
| 1,647,851 | 11/1927 | Bentley | 29—490 X |
| 2,245,089 | 6/1941 | Hargrave | 269—286 X |
| 2,478,954 | 8/1949 | Tuttle et al. | 148—6.15 X |
| 2,854,367 | 9/1958 | Tuttle et al. | 148—6.15 X |

JOHN F. CAMPBELL, *Primary Examiner.*